Patented Aug. 21, 1923.

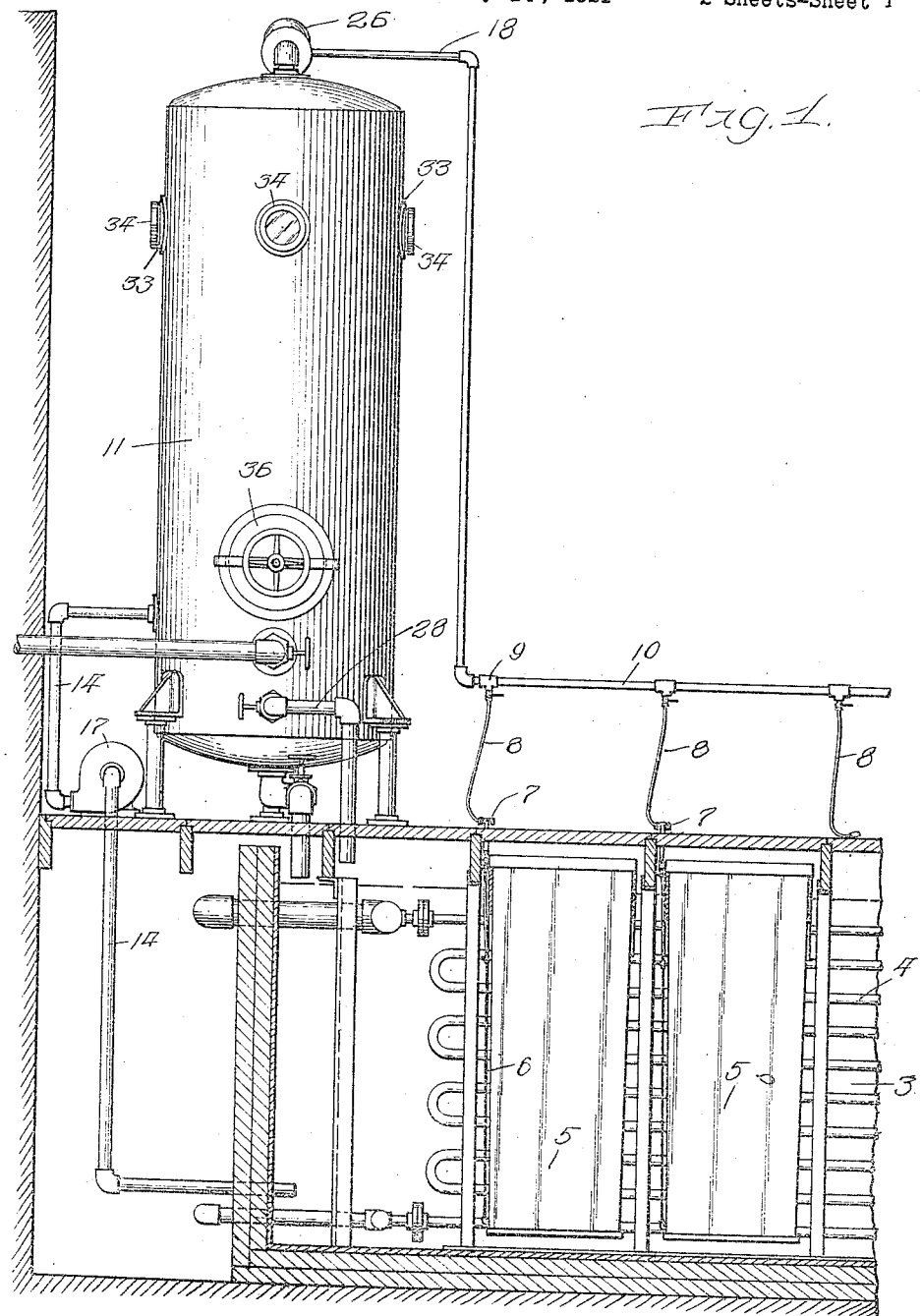

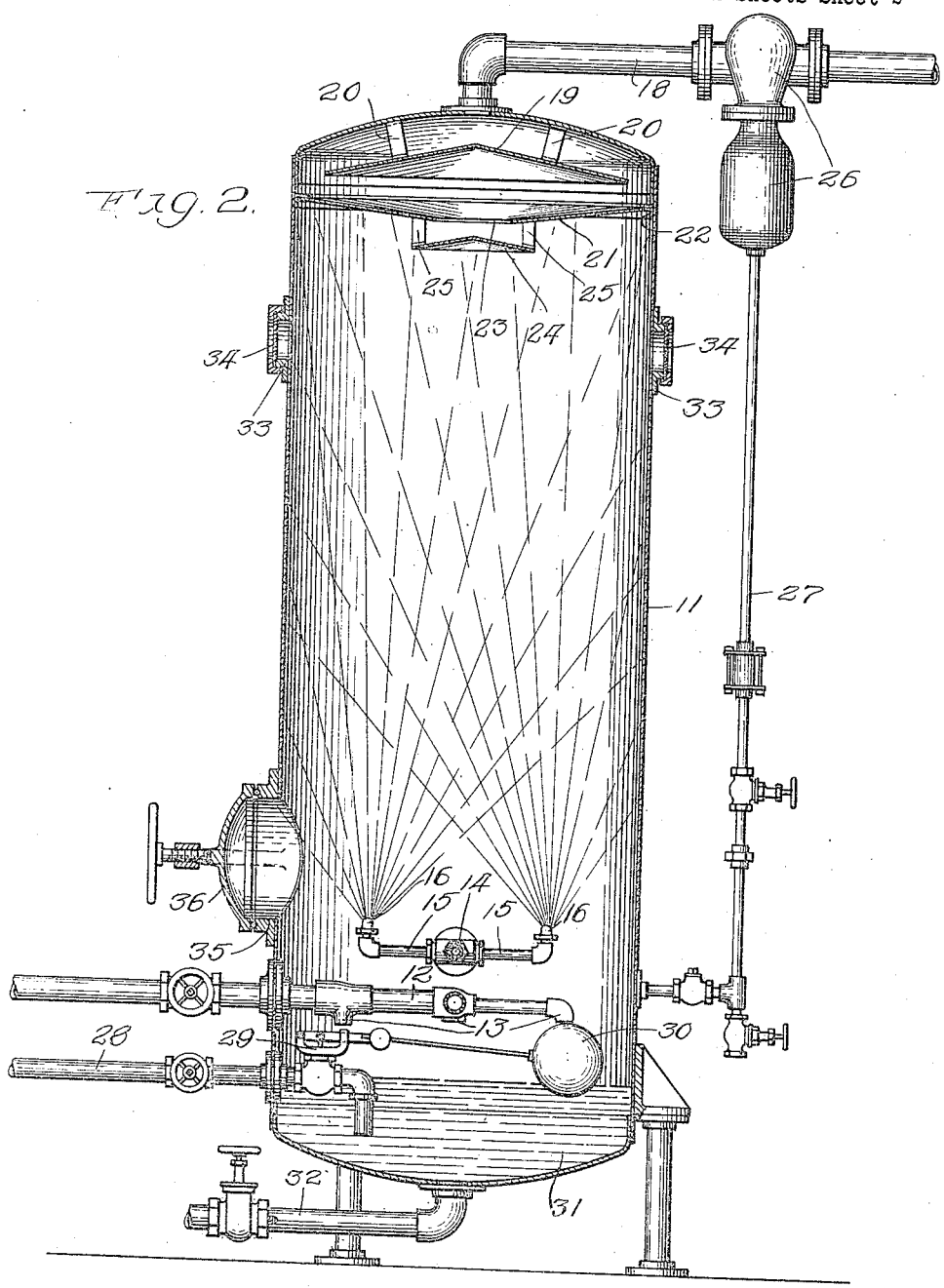

1,465,673

UNITED STATES PATENT OFFICE.

OTTO LUHR, OF CHICAGO, ILLINOIS, ASSIGNOR TO LUHR & FRIEDL, A FIRM COMPOSED OF OTTO LUHR AND HERMAN FRIEDL, OF CHICAGO, ILLINOIS.

ART OF DEHYDRATING GASEOUS FLUIDS.

Application filed July 14, 1921. Serial No. 484,615.

*To all whom it may concern:*

Be it known that I, OTTO LUHR, a citizen of the United States, residing at Chicago, in the county of Cook and State of Illinois, have invented a new and useful Improvement in the Art of Dehydrating Gaseous Fluids, of which the following is a specification.

My invention relates generally to the dehydrating of air, and as to certain phases thereof to the treatment of the air under pressure supplied to cans, in ice-making apparatus, in which the ice is to be formed, for agitating the water therein during freezing.

My objects, generally stated, are to provide for the removal of such moisture in the air which, if permitted to remain therein, would be liable to freeze in, and clog, the air pipes conveying the air to the refrigerating cans and subjected to the cooling action of the brine used for freezing the water in the cans; and to provide for the washing of the air to remove the solid material therein.

Referring to the accompanying drawings:

Figure 1 is a view in elevation, partly sectional and with parts broken away, of an ice-making plant suitable for practicing my improved method; and Figure 2, a view in vertical sectional elevation of the apparatus shown in Fig. 1.

In the particular construction shown, 3 represents a brine tank containing a series of vertically disposed refrigerating coils 4, a part of one only of which is shown, submerged in the brine and spaced apart and extending lengthwise of the tank 3, and 5, cans, two only of which are shown, in which the water to be frozen to form the ice cakes is contained, these cans being supported in the tank portion to extend into the brine and into the spaces between the series of coils 4, all in accordance with common practice.

Each can is shown as provided with an upwardly-extending pipe 6 which opens at its lower end into the can near the bottom of the latter, the upper ends of the pipes 6 being provided with couplings 7 connected, by means of pipes 8, with the valved branch-couplings 9 connected with, and opening into, an air-pipe 10.

The dehydrating and washing means shown comprise a tank 11 through a side of which, near its lower end, a pipe 12 extends, the inner end of this pipe containing preferably a plurality of outlets 13 preferably opening downwardly into the tank, this pipe leading from any suitable source (not shown) of air under the desired pressure, a desirable source being an air-compressor of any suitable construction.

Opening into the tank 14 near its bottom and as shown through its side wall and preferably above the air-pipe 12, is a pipe 14 which opens at its inner end into the tank 11, this pipe being preferably provided with branch pipes 15 equipped with a plurality of upwardly-discharging nozzles 16. The pipe 14 in the arrangement shown is in communication with the interior of the brine-tank 3 and is shown as containing a pump 17 by means of which refrigerated brine in the tank 3 is discharged into the tank 11 through the nozzles 16, the brine spraying upwardly in this tank as shown in Fig. 2. The top of the tank 11 contains an outlet communicating with a pipe 18 which leads to, and connects with, the pipe 10 and through which the air discharged into the tank 11 and acted on by the sprayed brine therein, discharges into the pipes 8 and 6 and thence into the cans, the tank containing in its upper portion baffle plates for intercepting the brine and separating it from the air in the passage of the air to the pipe 18. The baffling means shown comprise an upper plate 19 of conical form and of less diameter than the internal diameter of the tank 11, supported in spaced relation to the top of this tank by brackets 20 depending from the latter; an inverted frustro-conical plate 21 supported at its marginal edges on the inner side of the tank by a flange-ring 22, the plate 21 being disposed in vertically spaced relation to the plate 19 and containing a centrally disposed opening 23; and a relatively small plate 24 of conical form spaced vertically below the plate 21 and supported therefrom by brackets 25, these various baffle plates forming tortuous passages for the air in its travel to the outlet of the tank 11.

The pipe 18, by preference, has interposed therein a separator 26 of any desirable construction, by means of which substantially all of the brine carried over with the air in the flow of the latter from the tank 11, is separated and permitted to flow back to the tank 11 as through the pipe 27 leading at its upper end from the lower end of the separator 26 and opening at its lower end into the tank 11.

In the operation of the apparatus, the brine discharged into the tank 11 through the nozzle 16, gravitates to the bottom thereof where it accumulates, and as a means for providing for the automatic flow thereof from the tank without permitting escape of the air in the tank through the brine outlet, I provide a pipe 28 which opens at one end into the brine tank 3 and at its opposite end into the tank 11, adjacent the lower end of the latter, the inner open end of this pipe being equipped with a float-controlled valve 29 the float of which is represented at 30 and floats on the accumulated body of brine in the tank 11, represented at 31, the parts just described being so constructed and arranged that when the brine in the tank 11 reaches a predetermined level above the outlet pipe 28, the float moves to such a position in which the valve 29 is open, thereby permitting brine to flow from the tank 11 and back to the tank 3, the lowermost level assumed by the brine in the body 31 thereof being entirely above the open end of the pipe 28 so that a liquid seal for this outlet is constantly maintained, preventing the escape therefrom of the air introduced into the tank 11.

It will be understood from the foregoing that spraying the brine from the tank 3 into the tank 11 serves not only to wash the air of oil, such as may become mixed with the air in its passage through the air-compressor referred to, and other solid impurities, but also freezes moisture which the air may contain, the washed out substances and frozen moisture separating from the air in its passage to the outlet pipe 18 and gravitating to the bottom of the tank 11. As the brine used in the tank 11 is of substantially the same temperature as the cooled portion of the brine in the tank 3, by reason of the drawing of the brine from the lower portion thereof in the tank 3, the air delivered to the pipe 10 from the tank 11 is caused to be free of such of its contained moisture as would become frozen in its passage to the cans, if not removed as stated, and which, if not removed, would be liable to clog the air pipes.

The tank 11 is shown as provided with a valved drain-pipe 32 to drain the tank 11 when, and if, desired; and also as provided with sight openings 33 covered with transparent plates 34; and a manhole 35 equipped with a cover device 36 for permitting access to the interior of the tank if desired.

It may be added that the air discharging to the pipe 10 may contain a slight amount of salt, by reason of its contact with the brine, but, if anything, this is an advantage as the amount would be so small that it would not be noticeable in the ice and it would have the effect of rendering any possible moisture in the air less liable to freezing.

While I have illustrated and described a particular construction of apparatus for practicing my improved method, I do not wish to be understood as intending to limit the invention thereto as various changes and alterations may be made in the structure shown, and the method made practical by the use of other apparatus, without departing from the spirit of my invention.

What I claim as new, and desire to secure by Letters Patent, is:

1. The method of manufacturing ice which consists in subjecting water in cans located in a refrigerating bath to the refrigerating action of said bath, withdrawing liquid from said bath, contacting air with said withdrawn liquid to cool the same to substantially the temperature of the liquid whereby to condense moisture from said air, and agitating in said cans by means of said cooled air under pressure, the water to be frozen therein.

2. The method of manufacturing ice which consists in subjecting water in cans located in a refrigerating bath to the refrigerating action of said bath, withdrawing liquid from the bottom of said bath, contacting air with said withdrawn liquid to cool the same to substantially the temperature of the liquid whereby to condense moisture from said air, and agitating in said cans by means of said cooled air under pressure, the water to be frozen therein.

3. The method of manufacturing ice which consists in subjecting water in cans located in a refrigerating bath to the refrigerating action of said bath, withdrawing liquid from said bath, producing a spray of said withdrawn liquid, contacting air with said liquid spray to cool the same to substantially the temperature of the liquid whereby to condense moisture from said air, and agitating in said cans by means of said cooled air under pressure, the water to be frozen therein.

OTTO LUHR.